(12) United States Patent
Casalini et al.

(10) Patent No.: US 7,866,229 B2
(45) Date of Patent: Jan. 11, 2011

(54) AUTOMATIC LENGTH COMPENSATING DEVICE FOR A FLEXIBLE CABLE TRANSMISSION

(75) Inventors: Paolo Casalini, Pisa (IT); Alessandro Carli, Cascina (IT)

(73) Assignee: Magna Closures Inc., Newmarket (CA)

( * ) Notice: Subject to any disclaimer, the term of this patent is extended or adjusted under 35 U.S.C. 154(b) by 217 days.

(21) Appl. No.: 11/762,973

(22) Filed: Jun. 14, 2007

(65) Prior Publication Data

US 2007/0293722 A1 Dec. 20, 2007

(51) Int. Cl.
F16C 1/22 (2006.01)
(52) U.S. Cl. .................................. 74/501.5 R
(58) Field of Classification Search ............ 74/501.5 R, 74/502.4, 502.6; 403/105, 107, 109.1, 304; *F16C 1/10*
See application file for complete search history.

(56) References Cited

U.S. PATENT DOCUMENTS

| | | | |
|---|---|---|---|
| 4,941,286 A | | 7/1990 | Marscholl et al. |
| 4,984,386 A | | 1/1991 | Marscholl et al. |
| 5,178,034 A | * | 1/1993 | Reasoner ................... 74/502.6 |
| 5,295,408 A | * | 3/1994 | Nagle et al. ................ 74/502.6 |
| 5,477,745 A | * | 12/1995 | Boike et al. ................ 74/502.6 |
| 5,746,094 A | | 5/1998 | Medebach et al. |
| 6,131,482 A | | 10/2000 | Klippert et al. |
| 6,202,351 B1 | * | 3/2001 | Medebach ................... 49/352 |

FOREIGN PATENT DOCUMENTS

GB 2223797 4/1990

* cited by examiner

*Primary Examiner*—Thomas R Hannon
*Assistant Examiner*—Phillip A Johnson

(57) ABSTRACT

An automatic length compensating device (30) for a flexible cable transmission (8) having a core (12) sliding inside a sheath (10). The device (30) has a first and a second member (31, 32) inserted at least partly one inside the other in a predetermined direction (B) and defining, in that direction (B), respective through seats (33, 34) fitted through with the core (12) of the transmission (8); elastic means (35) interposed between the first and second member (31, 32), and which provide for increasing mutual withdrawal of the first and second member (31, 32); and releasable locking means (50) defining a number of mutually engaged positions of the first and second member (31, 32) corresponding to different extensions of the device (30) in the aforementioned direction (B). The second member (32) has two arms (40) engaged between two corresponding arms (38) of the first member (31), and the locking means are defined by toothed coupling means (50) between each arm (38) of the first member (31) and a corresponding arm (40) of the second member (32). (FIG. 4)

6 Claims, 4 Drawing Sheets

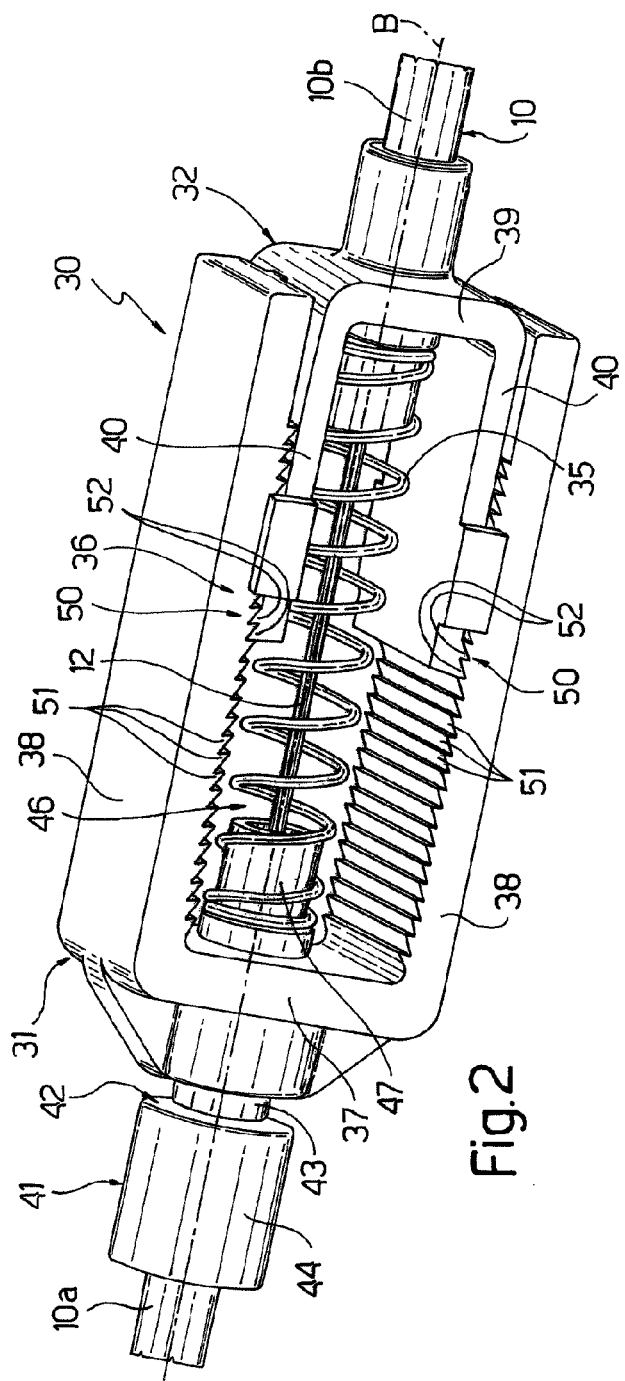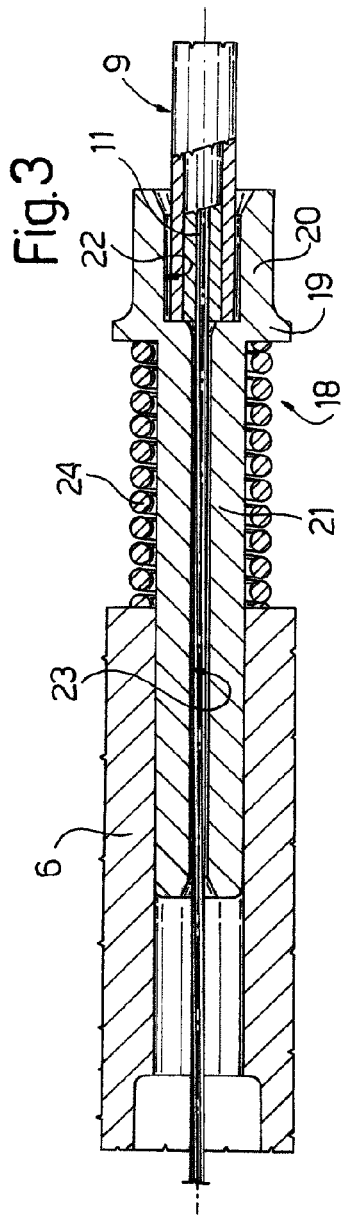

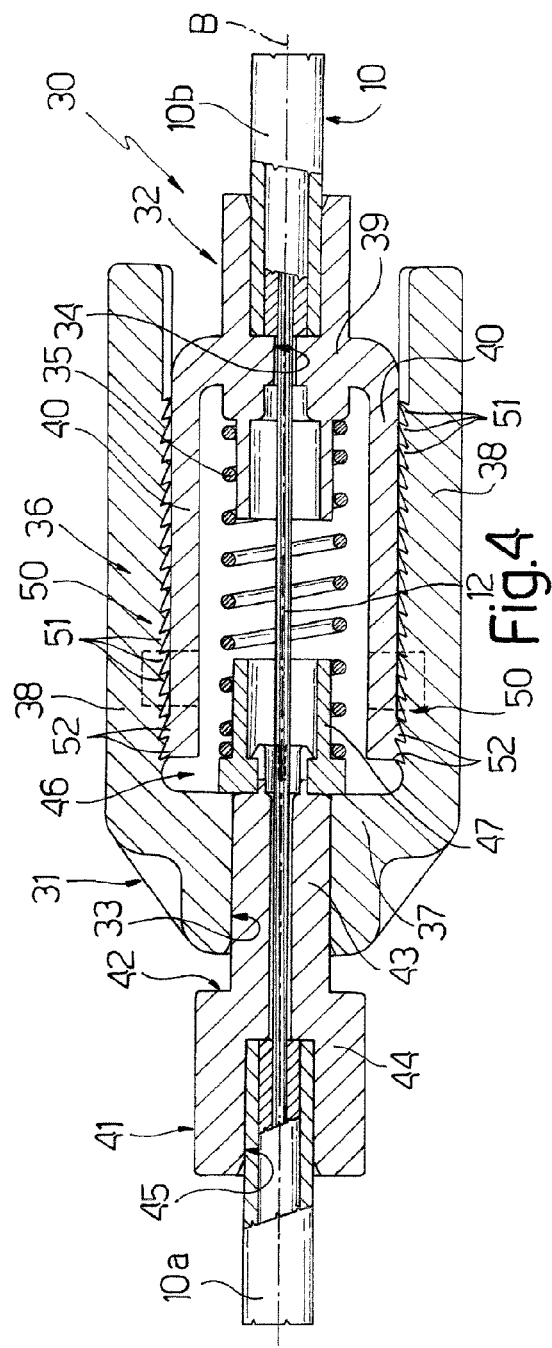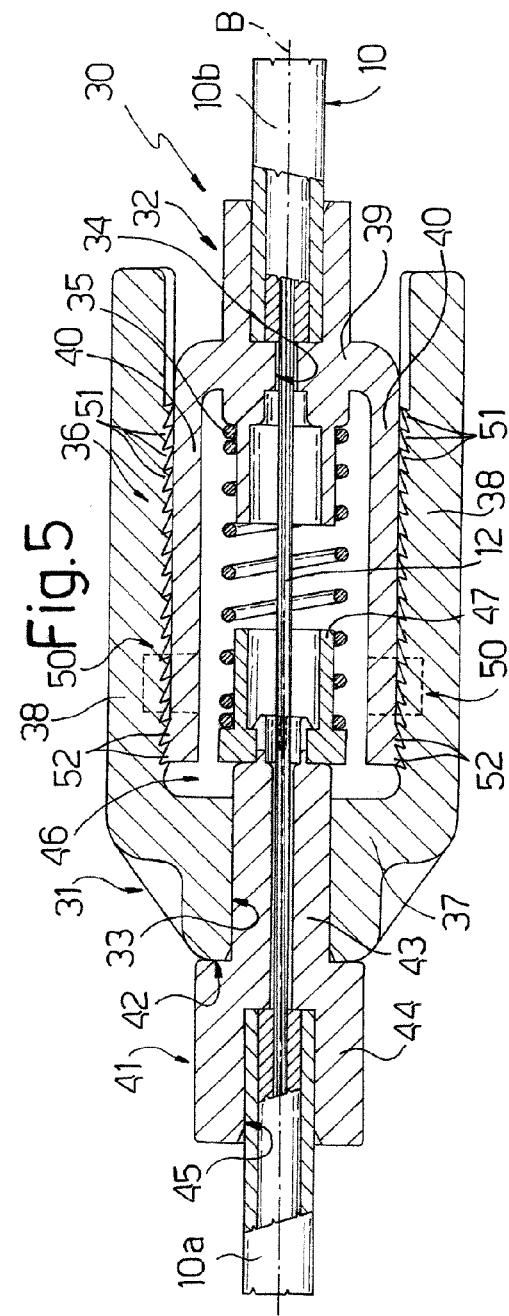

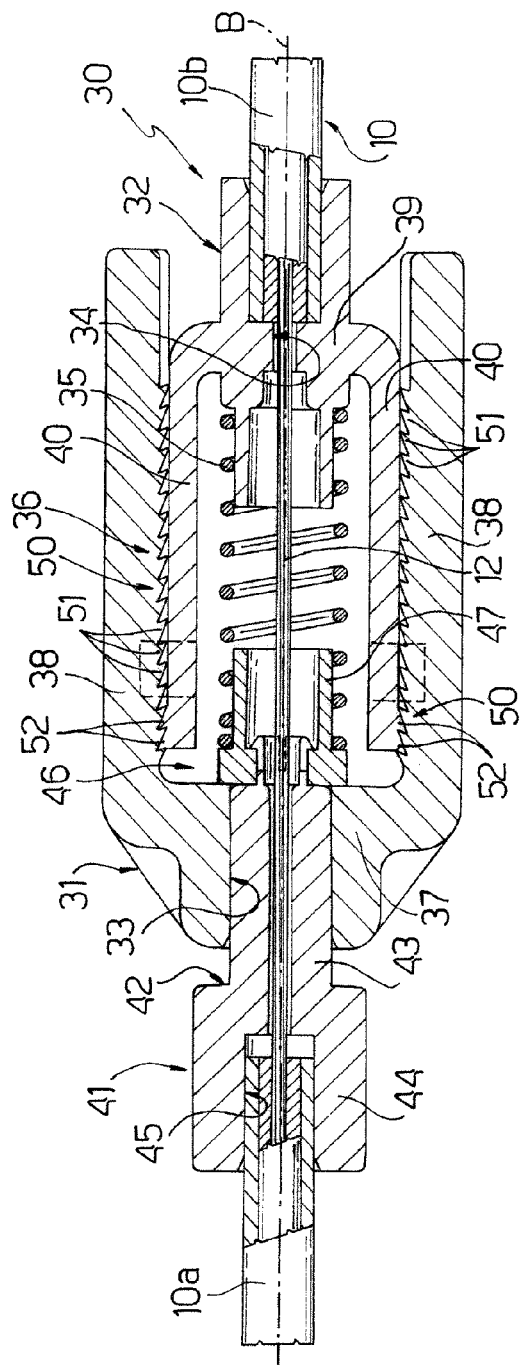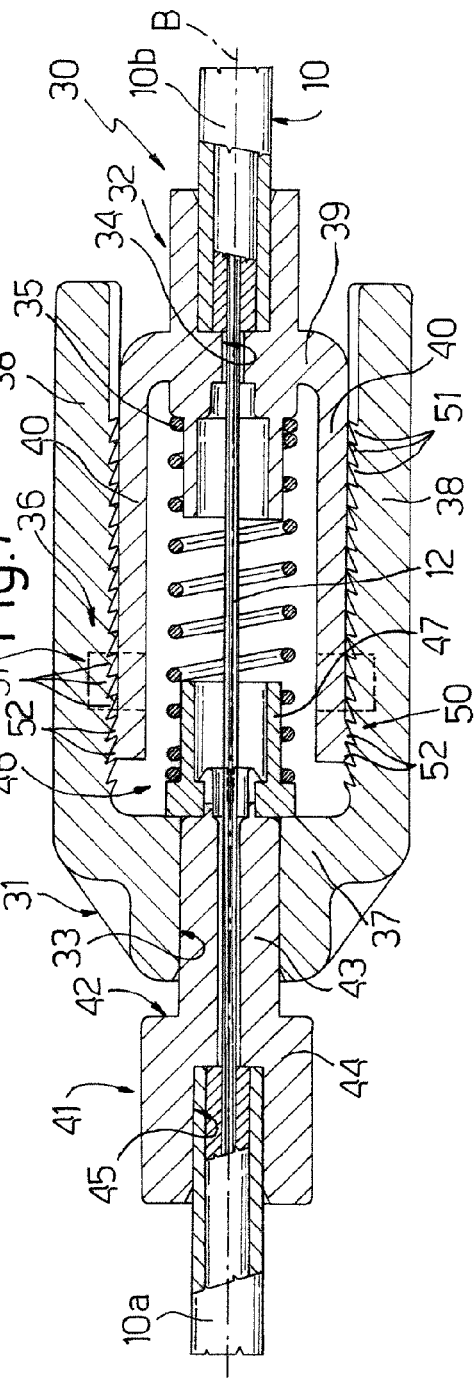

AUTOMATIC LENGTH COMPENSATING DEVICE FOR A FLEXIBLE CABLE TRANSMISSION

The present invention relates to an automatic length compensating device for a flexible cable transmission, such as a Bowden cable.

The device according to the present invention may be used to advantage, though not exclusively, in the automotive industry, and in particular for vehicle side door window regulator devices, to which the following description refers purely by way of example.

As is known, standard vehicle side doors normally comprise a supporting frame, in turn comprising an upper frame portion defining a window opening closed by a sliding window, and a lower box portion open at the top facing the window opening and defined by an inner wall and an outer wall, both made of sheet metal and connected around the edges. The inner and outer walls define a compartment housing the window, when this is lowered, and various functional units, such as a window regulator and a door lock.

Window regulators are known which substantially comprise a guide fixed vertically inside the lower box portion of the door; a shoe integral with the window and which slides along the guide; a control member, e.g. an electric motor or a crank, for controlling movement of the shoe, and hence of the window, along the guide; a supporting member for supporting the control member and also fixed to the lower box portion of the door; and a flexible cable transmission for transmitting motion from the control member to the shoe.

The flexible cable transmission normally comprises one or more sheath portions, and one or more wires sliding inside the sheath portions.

The control member normally drives a drum on which respective ends of two wires are wound partly and fixed in different angular positions, so that the wires extend from the drum in opposite directions and wind about respective idle pulleys fixed to the top and bottom ends respectively of the guide; and the opposite ends of the two wires are fixed to opposite sides of the shoe integral with the window.

Between the drum and the top and bottom ends of the vertical guide, the two wires engage respective sheath portions having fixed opposite ends and which determine the desired wire configuration.

In other words, the drum, the two sheath portions, and the shoe together define an endless path for the two wires, so that, for each rotation of the drum about its axis, the wires slide inside the respective sheath portions to slide the shoe, and hence the window, along the vertical guide.

In one commonly used known solution, each sheath portion has one end fixed, for example, to the guide, and the opposite end connected to the control member supporting member with the interposition of a cylindrical helical spring; and, when the window reaches the top and bottom limit positions, the two springs are compressed in turns. That is, each limit position of the window corresponds to compression of one of the two springs.

Continual use of the window regulator device inevitably results eventually in a certain amount of stretch of the transmission wires, thus resulting in longitudinal slack between the wires and respective sheath portions, so that, when operated, part of the operation of the control member is ineffective in moving the window.

The formation of slack within a flexible cable transmission obviously poses problems in any application calling for a precise relationship between operation of the drive member and resulting operation of the driven member.

For example, in convertible cars, as is known, the supporting frame of the door has no upper frame, which means the top edge of the window rests directly on the hood seals when the hood is up.

Therefore, to keep the window positioned correctly with respect to the top seal, the window is automatically lowered slightly when the door is opened, and returns to the fully raised position when the door is closed.

By so doing, the top edge of the window is always centred with respect to the top seal, i.e. is covered by the top seal both inside and outside the car. On the other hand, if the window were not lowered and raised as described above, the top edge of the window could, when the door is closed, be located entirely on the outside of the seal, thus impairing operation of the window and possibly resulting in a whistling noise when the car is running.

The slight down-up movement of the window when opening-closing the door is produced by minimal operation of the control member. But, if one or both of the wires are stretched with respect to the sheath portions, the above programmed operation of the control member could coincide wholly or in part with the portion of its operation which has no effect on the window.

To eliminate this drawback, automatic length compensating devices for flexible cable transmissions have been devised, such as the one described in U.S. Pat. No. 5,746,094, to automatically compensate for any in-service slack produced between the sheath portions and relative wires.

More specifically, the device described in U.S. Pat. No. 5,746,094 substantially comprises two tubular members fitted partly one inside the other and defining respective through seats for one wire of the flexible cable transmission wire. And the two members are made integral with respective sheath portions or with a sheath portion and a fixed support.

The device also comprises a cylindrical helical spring wound coaxially about the outer member, and which is interposed between an outer annular shoulder of the outer member and a radially projecting end portion of the other member, and provides for increasing mutual withdrawal of the members.

The inner member has outer circular teeth meshing with corresponding teeth on a tubular sleeve, which is fitted on the outside of the inner member and housed movably, between two limit positions, inside a cylindrical chamber formed between the two members.

The meshing teeth define a number of mutually engaged positions of two tubular members, which correspond to different longitudinal extensions of the device. In other words, in the event of slack forming between the wire and sheath of the flexible cable transmission, e.g. due to stretching of the wire, it is immediately taken up by the spring, which increases mutual withdrawal of the two members, so that, given the geometry of the connections involved, the teeth are temporarily released until a condition of equilibrium is again established in which the teeth mesh once more to define a different mutually engaged position of the two members.

Though functionally valid, devices of the type described have the following drawbacks.

First and foremost, being tubular, disassembling and reassembling the device involves a certain amount of deformation of one or both of the members, so that devices of this type are unsuitable for applications involving frequent assembly and disassembly.

Secondly, as is known, window regulators and the above devices are normally housed in the damp part of the lower box portion of the door. Which means water may collect inside the devices and, easy drainage being prevented by the tubular shape of the devices, may freeze in winter, thus impairing operation.

Finally, location of the spring, in devices of the above type, on the outside of both the tubular members results in a relatively large-diameter spring and may pose problems as regards correct sizing of the window regulator device. In fact, as is known, the automatic length compensating device is only fitted to one of the two sheath portions extending from the window regular device drum to the window guide, while the other sheath portion employs an ordinary cylindrical helical spring interposed between the end of the relative sheath portion and the drum supporting member; and, when the two springs differ widely in diameter, correctly balancing the rigidity of the springs may prove difficult.

It is an object of the present invention to provide a flexible cable transmission automatic length compensating device designed to provide a straightforward, low-cost solution to at least one of the aforementioned drawbacks typically associated with known devices.

According to the present invention, there is provided a flexible cable transmission automatic length compensating device as claimed in claim 1.

A preferred, non-limiting embodiment of the present invention will be described by way of example with reference to the accompanying drawings, in which:

FIG. 2 shows a larger-scale view in perspective of the FIG. 1 device;

FIG. 3 shows a larger-scale axial section of a detail of a flexible cable transmission of the FIG. 1 window regulator;

FIG. 4 shows a larger-scale longitudinal section of the FIG. 1 and 2 device;

FIG. 5 shows a longitudinal section of the FIG. 4 device relative to a limit position of the vehicle window;

FIG. 6 shows a longitudinal section of the FIG. 4 device relative to a hypothetical condition involving longitudinal slack in the flexible cable transmission to which the device is fitted;

FIG. 7 shows a longitudinal section of the FIG. 6 device relative to a condition in which the longitudinal slack in the flexible cable transmission has been taken up.

Figure 1:
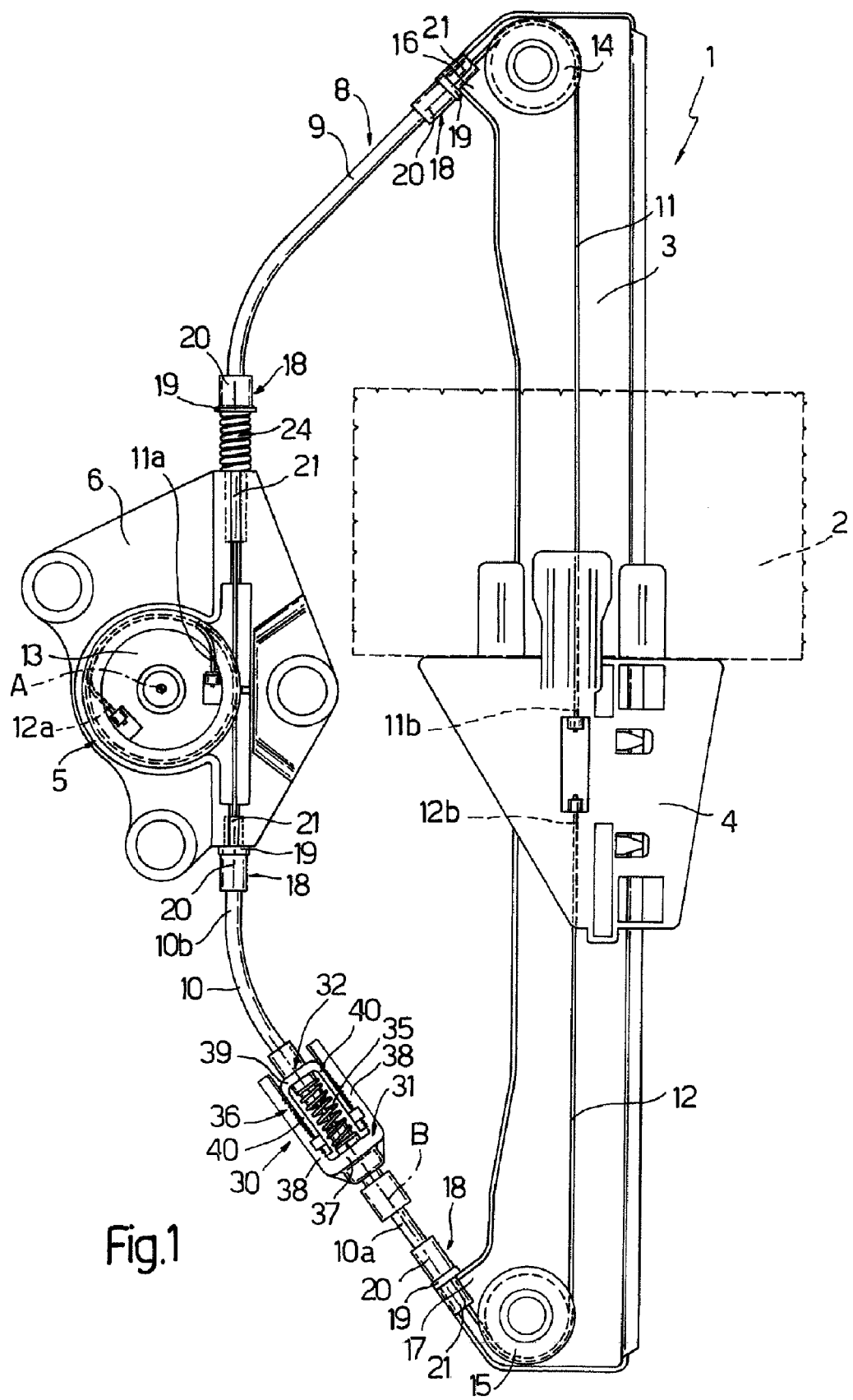
FIG. 1 shows a front view of a vehicle window regulator in the operating position and featuring a flexible cable transmission automatic length compensating device in accordance with the teachings of the present invention.

Number 1 in FIG. 1 indicates as a whole a window regulator for regulating a window 2 of a vehicle door (known and not shown).

Window regulator 1 substantially comprises a guide 3 fixed vertically inside a lower box portion (not shown) of the door; a shoe 4 integral with window 2 and mounted to slide along guide 3; a control member 5 for controlling the movement of shoe 4, and therefore of window 2, along guide 3; a supporting plate 6 supporting control member 5 and also fixed, in known manner (not shown), to the lower box portion of the door; and a flexible cable transmission 8 for transmitting motion from control member 5 to shoe 4.

In the example shown, transmission 8 comprises two sheath portions 9, 10; and two wires 11, 12 which slide through respective sheath portions 9, 10.

Control member 5 is defined by a drum 13 which is fitted in axially fixed manner to plate 6 to rotate about a respective axis A crosswise to window 2, and is driven in known manner by an electric motor or a crank (not shown).

One end 11a of wire 11 and one end 12a of wire 12 are fixed in different angular positions to drum 13, so that wires 11, 12 extend from drum 13 in opposite directions and wind about respective idle pulleys 14, 15 fixed to the top end 16 and bottom end 17 respectively of guide 3. The other ends 11b, 12b of wires 11, 12 are fixed to opposite sides—in the example shown, to the top and bottom—of shoe 4 integral with window 2.

Sheath portions 9, 10 extend between plate 6 and the top and bottom ends 16, 17 of guide 3. More specifically, sheath portion 9 has one end fixed to a top edge of plate 6, and the opposite end fixed to a lateral edge of top end 16 of guide 3; and sheath portion 10 has one end fixed to a bottom edge of plate 6, and the opposite end fixed to a lateral edge of bottom end 17 of guide 3.

More specifically, each end of sheath portions 9, 10 is fixed to plate 6 or guide 3 by a respective tubular sleeve 18. As shown in FIGS. 1 and 3, each sleeve 18 has an annular flange 19 projecting radially outwards and dividing sleeve 18 into two separate portions 20, 21 defining, internally, respective cylindrical through seats 22, 23 of different cross sections. The larger-diameter seat 22 houses a relative end of relative sheath portion 9, 10 fitted through with relative wire 11, 12; whereas seat 23 is engaged solely by wire 11, 12.

With reference to sheath portion 10, flanges 19 of sleeves 18 rest on the bottom edge of plate 6 and on the lateral edge of end 17 of guide 3 respectively; and respective portions 21 are fitted inside respective seats formed in said edges. With reference to sheath portion 9, only sleeve 18 adjacent to guide 3 is positioned with flange 19 resting on the lateral edge of top end 16 of guide 3, and with portion 21 fitted inside said edge; while the other sleeve 18 has respective portion 21 inserted inside a respective seat formed in plate 6, and comprises, between respective flange 19 and the top edge of plate 6, a cylindrical helical spring 24 wound about portion 21.

As shown in FIG. 1, shoe 4, the two sheath portions 9, 10, and drum 13 together define an endless path for the two wires 11, 12, so that, for each rotation of drum 13 about respective axis A, wires 11, 12 slide inside respective sheath portions 9, 10 to slide shoe 4, and therefore window 2, along guide 3.

An automatic length compensating device 30 in accordance with the teachings of the present invention is fitted along sheath portion 10, divides sheath portion 10 into two parts—hereinafter indicated 10a and 10b—and is fitted through with wire 12.

As shown in FIGS. 1, 2, 4, 5, 6 and 7, device 30 extends in a direction B coincident with the axis of sheath portion 10, and substantially comprises a first and second member 31, 32 inserted partly one inside the other, connected respectively to parts 10a and 10b of sheath portion 10, and defining respective cylindrical through seats 33, 34 fitted through with wire 12. Device 30 also comprises a cylindrical helical spring 35 interposed between members 31 and 32, and which provides for increasing mutual withdrawal of members 31 and 32; and releasable locking means 36 defining a number of mutually engaged positions of members 31 and 32 corresponding to different extensions of device 30 in direction B.

More specifically, members 31, 32 are both C-shaped with their cavities facing. Member 31 comprises an end portion 37 crosswise to direction B, and two arms 38 projecting from end portion 37 in a direction parallel to direction B; and, likewise, member 32 comprises an end portion 39 crosswise to direction B, and two arms 40 projecting from end portion 39 in a direction parallel to direction B and engaged between arms 38 of member 31.

More specifically, end portion 37, 39 of each member 31, 32 defines respective cylindrical through seat 33, 34 for wire 12 coaxially with direction B, and relative arms 38, 40 are flat and parallel to direction B, and extend on diametrically opposite sides of the axis of seat 33, 34.

As shown clearly in FIGS. 2, 4, 5, 6, and 7, seat 33 of member 31 is engaged in axially sliding manner by a tubular sleeve 41 fitted through with wire 12 and supporting a relative end of part 10a of sheath portion 10. More specifically, on the outside, sleeve 41 defines an intermediate annular shoulder 42 facing end portion 37 of member 31, and which rests against end portion 37 when window 2 is in the bottom limit position, as explained in detail below. Shoulder 42 divides sleeve 41 into two axial portions 43, 44, one of which (43) is smaller in diameter and slides through seat 33 in end portion 37 of member 31, while the other (44) is located outside member 31.

Sleeve 41 defines a through seat 45 having a wider cross section at portion 44 to house and permit one-way locking of the relative end of part 10a of sheath portion 10 in the direction of member 32.

Seat 34 of end portion 39 of member 32 is fitted through with wire 12, and houses a relative end of part 10b of sheath portion 10. More specifically, on the opposite side to that from which arms 40 extend, seat 34 has a wider cross section to house and permit one-way locking of the relative end of part 10b of sheath portion 10 in the direction of member 31.

Spring 35 extends coaxially with direction B, and is housed in a region 46 bounded by end portions 37, 39 and arms 38, 40 of members 31 and 32. More specifically, one end of spring 35 rests against end portion 39 of member 32, and the other end rests against a raised outer annular edge of a bush 47, which is pushed against the end of sleeve 41 facing region 46, and against an area of end portion 37 of member 31 surrounding said end of sleeve 41.

As shown in FIG. 1, spring 35 has roughly the same diameter as spring 24, thus eliminating any problem of balancing the rigidity of the two springs.

Locking means 36 are defined by respective toothed couplings 50 between arms 38 of member 31 and corresponding arms 40 of member 32. Each toothed coupling 50 comprises a number of first teeth 51 formed on relative arm 38 of member 31; and at least one second tooth 52—in the example shown, two second teeth 52 formed on the free end of corresponding arm 40 of member 32 and engaging adjacent gaps between teeth 51.

As shown in FIGS. 2, 4, 5, 6 and 7, each tooth 51, 52 has a section in the form of an obtuse-angle triangle, and is bounded by sloping opposite sides to prevent further nesting of members 31 and 32 in direction B, while on the other hand permitting mutual withdrawal of members 31 and 32. More specifically, the opposite sides of each tooth 51 of member 31 form respective acute angles with direction B towards end portion 37, and teeth 52 are complementary in shape to the gaps between teeth 51.

In actual use, via transmission 8, rotation of drum 13 in opposite directions moves shoe 4 along rail 3 to raise and lower window 2 respectively.

FIG. 4 shows the configuration of device 30 when window regulator 1 is idle.

When window 2 is in the bottom limit position, shoulder 42 of sleeve 41 is positioned resting against end portion 37 of member 31, thus moving bush 47 in direction B towards end portion 39 of member 31 and compressing spring 35 (FIG. 5). When drum 13 stops, spring 35 restores bush 47 and sleeve 41 to their original positions in FIG. 4, in which shoulder 42 is detached from end portion 37 of member 31. At this stage, the nesting position of members 31 and 32 remains unchanged, and corresponds to a predetermined extension of device 30 in direction B.

When window 2 is in the top limit position, on the other hand, spring 24 is compressed.

FIG. 6 shows a hypothetical condition in which slack is produced between wire 12 and part 10a of sheath portion 10; which condition may only arise when the window regulator is not equipped with device 30.

In the present case, on the other hand, any longitudinal slack between wire 12 and relative sheath portion 10 is immediately taken up by spring 35, which first releases the teeth 51 and 52 meshing at the time, thus increasing mutual withdrawal of members 31 and 32, and then causes teeth 52 to mesh with teeth 51 further away from end portion 37 of member 31 (FIG. 7). Device 30 thus increases its own overall extension in direction B to compensate for stretching of relative wire 12.

The advantages of device 30 according to the present invention will be clear from the foregoing description.

In particular, the C shape of members 31 and 32 and the toothed couplings formed between them along respective arms 38 and 40 make device 30 easy to disassemble with no permanent deformation of the engaged parts. In fact, members 31 and 32 can be disconnected by simply moving inner arms 40 towards each other to release teeth 51 and 52.

The "open" design of members 31 and 32 also prevents any damp, in the door area in which window regulator 1 is normally housed, from collecting inside device 30 and possibly freezing in winter.

Finally, being housed inside members 31 and 32, spring 35 is comparable in diameter to spring 24 of window regulator 1, thus making it easier to balance the rigidity of the two springs.

Clearly, changes may be made to device 30 as described and illustrated herein without, however, departing from the protective scope defined in the accompanying claims.

The invention claimed is:

1. An automatic length compensating device (30) for a flexible cable transmission (8) having a core (12) sliding inside a first sheath part and a second sheath part, said device (30) comprising:

an outer member (31) and an inner member (32) inserted at least partly inside the outer member in a predetermined direction (B) and defining, in said direction (B), respective through seats (33, 34) fitted through with the core (12) of said transmission (8), the outer member (31) being engaged with an end of the first sheath part and having first and second opposed outer arms (38) that extend parallel to said direction (B), and the inner member (32) being engaged with an end of the second sheath part and having first and second opposed inner arms (40) that extend parallel to said direction (B), and that together fit between the first and second outer arms (38), wherein the first and second inner arms (40) have an outwardly facing toothed portion, and the first and second outer arms have an inwardly facing toothed portion that releasably engages the outwardly facing toothed portion over a range of relative positions between the outer and inner members corresponding to a range of degrees of extension of the automatic length compensating device; and elastic means (35) interposed between said outer and inner members (31, 32), wherein the inwardly and outwardly facing toothed portions contain teeth that are shaped to permit the elastic means to mutually withdraw the inner and outer members (31, 32) from each other sufficiently to maintain engagement between the outer and inner members with the respective ends of the first and second sheath parts in the event of a lengthening of the core.

2. A device as claimed in claim 1, characterized in that said elastic means (35) are housed between the arms (38, 40) of said outer and inner members (31, 32).

3. A device as claimed in claim 2, characterized in that said outer and inner members (31, 32) each comprise, crosswise to said direction (B), an end portion (37, 39) from which the respective said arms (38, 40) project; and in that said elastic means comprise a spiral spring (35) extending between said end portions (37, 38) of said outer and inner members (31, 32).

4. A device as claimed in claim 3, characterized in that said inwardly facing toothed portion comprises a plurality of first teeth (51) formed on each arm (38) of said outer member (31); and at least one second tooth (52) formed on each arm (40) of said inner member (32) and engaging a gap between two adjacent first teeth (51) on the corresponding arm (38) of said first member (31).

5. A device as claimed in claim 4, characterized in that said first teeth (51) and said at least one second tooth (52) are each bounded by sloping opposite sides to prevent further nesting of said and said inner member (31, 32) in said direction (B), while at the same time permitting an increase in mutual withdrawal of the outer and inner members from each other.

6. A device as claimed in claim 1, characterized in that said inner and outer members, when assembled together, define a lateral passthrough aperture that permits drainage of water from the device.

\* \* \* \* \*